United States Patent

Langlinais

[15] 3,635,326

[45] Jan. 18, 1972

[54] DISTRIBUTING APPARATUS

[72] Inventor: Vernon L. Langlinais, New Iberia, La.

[73] Assignee: Morton-Norwich Products, Inc., Chicago, Ill.

[22] Filed: May 1, 1970

[21] Appl. No.: 33,648

[52] U.S. Cl. ....................198/52, 193/2

[51] Int. Cl. ....................B65g 47/18

[58] Field of Search ....................198/43, 45, 48, 56, 52; 193/2, 193/3, 4, 5

[56] References Cited

UNITED STATES PATENTS

| | | | |
|---|---|---|---|
| 3,232,416 | 1/1966 | Winter | 193/2 |
| 1,047,316 | 12/1912 | Sica | 193/2 |

*Primary Examiner*—Richard E. Aegerter
*Assistant Examiner*—Hadd S. Lane
*Attorney*—Jack Axelrood

[57] ABSTRACT

A distributing apparatus for providing uniform distribution of granular, crystalline or amorphous solids onto a bed or moving belt involving use of a discharge chute to carry said solids and discharging them onto a sloping discharge surface resulting in a uniform distribution of said solids over the entire width of said bed or moving belt.

6 Claims, 7 Drawing Figures

16 10 8 6 4 20 12 2 18 14

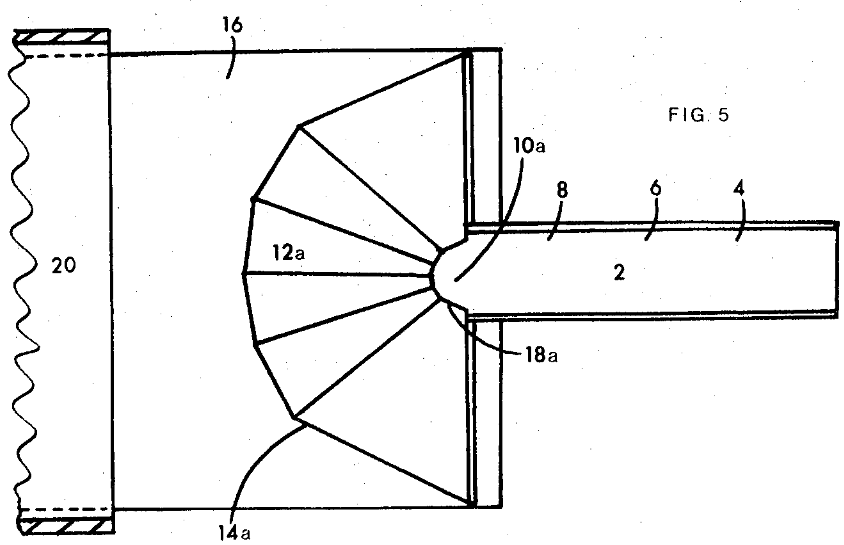
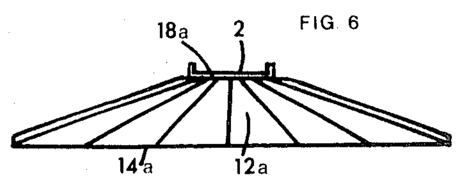
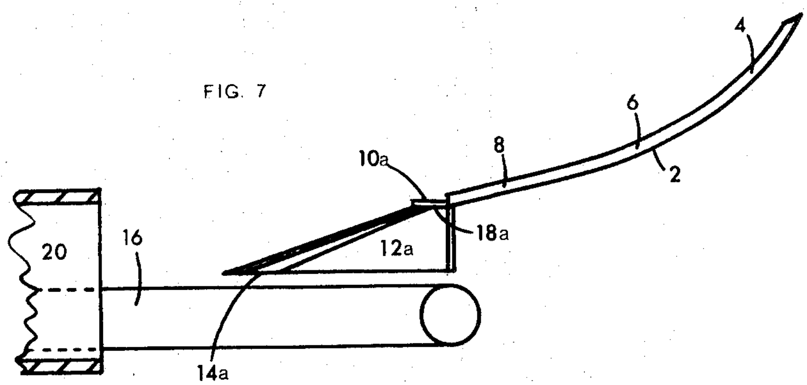
INVENTOR.
VERNON L. LANGLINAIS
BY
Jack Ashead

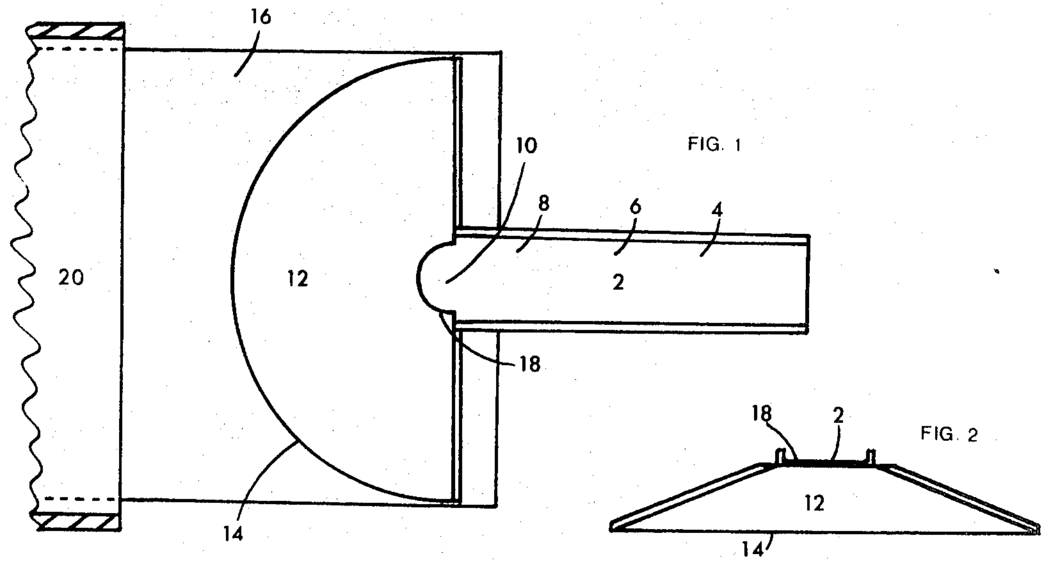
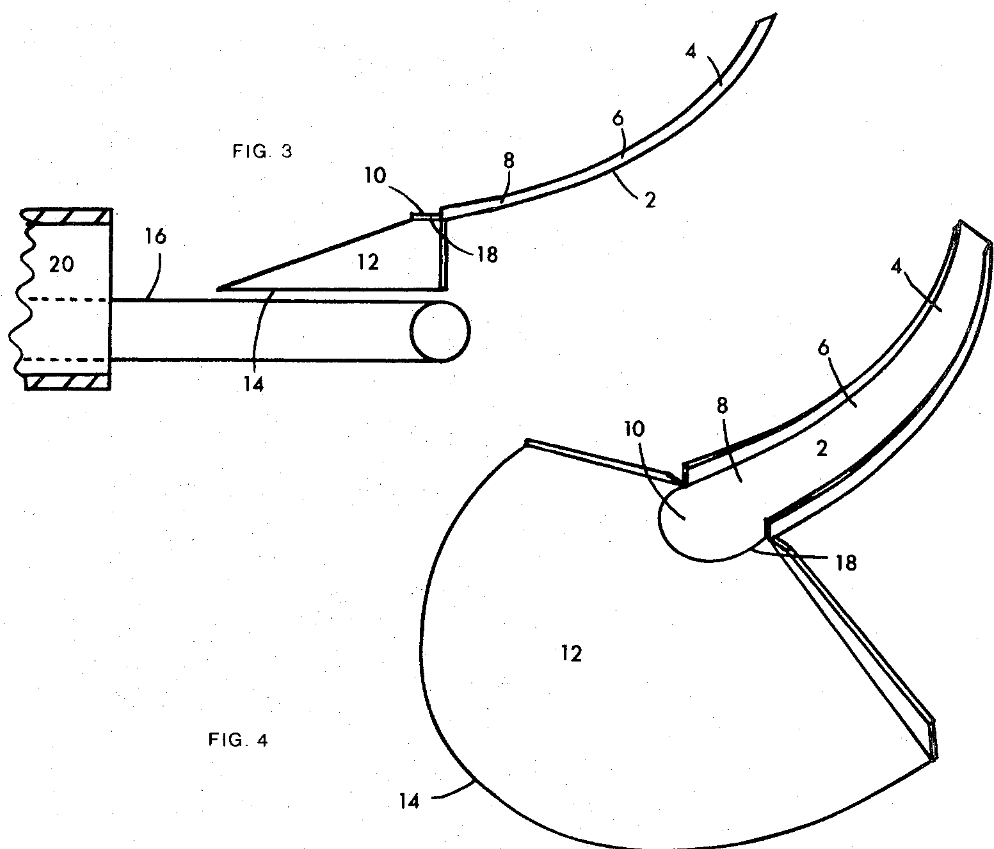
INVENTOR.
VERNON L. LANGLINAIS
BY

DISTRIBUTING APPARATUS

BACKGROUND OF THE INVENTION

1. Field Of The Invention

In industries where particulate solid articles are processed in operations such as washing, drying, coating, pressing, heating, etc., one problem encountered is the controlled uniform distribution of such solids onto a bed or moving belt. Such articles flowing out of a chute are conventionally deposited in a narrow concentration on said bed or belt immediately below said chute. In most operations it is preferred that said articles be deposited in uniform thickness over a wider area so that any subsequent operation is more efficient. The degree of uniformity of distribution of such articles usually directly affects the operation or process to which the articles are being subjected. When there is greater uniformity of distribution, it usually follows that higher operating efficiency results and greater product uniformity is attained. For example, in a drying operation nonuniform distribution of articles on a bed or moving belt frequently results in nonuniform pressure-drop across the bed, reduction of thermal efficiency and/or significant variation in the concentration of the volatile component of the dried product.

Accordingly, some apparatus must be interposed between the source of such articles and the bed on which they are to be deposited. Such an apparatus must take into consideration factors relevant to both the articles being distributed and the process for which they are being prepared. The articles which are to be distributed are often fragile in nature and must be treated gently in order to prevent breakage or fragmentation with the resulting loss of product. Most processes with which such an apparatus is used require a maximum of uniformity of distribution of articles. Concentrations of articles in either the center or along the edge of a bed defeat the benefits of such a distributing apparatus. Concentrations of articles in either the center or along the edge of a bed defeat the benefits of such a distributing apparatus. Also, the distributing apparatus should be relatively maintenance free and inexpensive.

2. Description of Prior Art

Conventional distributing apparatus distribute either by means of gravity or by means or mechanical power in conjunction with gravity. A gravity-powered apparatus generally requires mechanical dividers or separators which separate portions of articles from a chute and guide them to spaced discharge points. The difficulty with this type of apparatus is that articles which are fragile tend to break or disintegrate when they flow against the dividers. Also, the positioning of separators is critical and must be adjusted for any minor change in specific gravity or size of the articles involved.

A distributing apparatus using mechanical power might use a vibrator or oscillator attached to said apparatus. Movement caused by these devices tends to effect the distribution of articles on the surface which is being agitated or moved. However, a number of disadvantages may result with the use of such devices. First, the movement causes an abrasion of the articles against the surface. This may cause attrition, breakage or fragmentation of such articles. Also, certain areas may end up with higher concentrations of articles depending upon the frequency of vibration, the harmonics developed by various portions of the surface and by a lack of structural or level uniformity in said surface. Further, these devices are relatively costly to maintain.

Accordingly, it is an object of this invention to provide an article-distributing apparatus of low cost and minimum maintenance.

It is also an object of this invention to provide an article-distributing apparatus which will cause a minimum of damage to the articles being distributed.

It is a further object of this invention to provide an article-distributing apparatus which attains a high degree of uniformity of distribution of the articles being distributed.

SUMMARY OF THE INVENTION

In one broad form the distributing apparatus is comprised of a discharge chute, comprising a bottom and integral sidewalls, an arcuately shaped discharge lip extension of the bottom of said chute and a sloping discharge surface extending outwardly and downwardly therefrom. The discharge surface extends from the edge of the discharge lip, said surface having an arcuately shaped discharge terminus which receives the articles being directed from the lip extension and discharges them onto the desired bed or moving belt. The chute and the sloping discharge surface may be constructed either integrally or separately. The angle of incline of both the chute and the discharge surface may vary from about 5° to about 40° from the horizontal. The diameter of the upper portion of the discharge surface is approximately equal to that of the discharge lip of the inclined chute while the diameter at the terminus of said discharge surface is approximately equal to the width of the receiving bed. The apparatus is designed to use gravitational forces alone or, if desired, gravity in conjunction with oscillators, vibrators or sonic devices. The chute may be inclined in such a way to reduce the speed of the articles transported so that when they reach the discharge lip of said chute their linear flow rate is controlled. A flexible drag-flap pivoted gate, wheel, or other device may be used to restrain the articles at the point of discharge.

Though the discharge lip of the chute and the discharge terminus of the discharge surface may be a variety of shapes, the preferred shape is arcuate. Another beneficial shape for the lip and discharge surface terminus is a series of chords of an arc, said chords being defined by the intersection with the circumference of said arc of line segments perpendicular to the diameter of said arc and coequally spaced along said diameter. In the instance that the lip of the chute and the discharge terminus of the surface area are each defined by chords of an arc, the chords should be equal in number. The resulting shape of the discharge surface is a series of pie-shaped bevels. It is possible to use a surface which describes less than a complete semicircle. For example, the surface may describe an arc as small as 90°. In the instance when the arc used is less than a complete semicircle, the radius of the arc should be sufficient to have the discharge surface cover the full width of the discharge lip and the width of the receiving bed. Low-friction materials such as tetrafluoroethylene, polyethylene and polypropylene may be used on the chute and discharge surfaces. The use of such low-friction material allows for minimum angles of inclination for both the chute and the discharge surface and therefore minimum headroom requirements. Polished construction materials can also be used for these surfaces.

One such apparatus is illustrative of this invention. It is used for the the intersection of spreading salt briquettes on a moving belt in order that they may be oven dried. The apparatus provides both uniform distribution and delicate handling required to preserve the physical integrity of the fragile articles involved. The apparatus comprises a chute, the upper end of which is vertically positioned immediately below a device for forming salt into briquettes. The body of the chute is curved and terminates in a relatively horizontal discharge lip. The discharge lip is made up of six chords of an arc, each chord defined by the intersection of the arc and a line perpendicular to the diameter of said arc, said lines spaced coequally along said diameter. The diameter of the discharge lip is approximately equal to the width of said chute. A discharge surface extends outwardly and downwardly from said discharge lip to a discharge terminus, which discharge terminus has a diameter approximately equal to the width of the belt. The discharge terminus is comprised of chords defined similarly as the chords of the discharge lip. The discharge surface is thus a series of pie-shaped bevels constituting a surface which connects the chorded discharge lip and the chorded discharge terminus. The discharge surface is angled at from about 15° to about 25° from the horizontal and covers an arc of about 150°. Both the chute and the discharge surface are made of tetrafluoroethylene-covered steel.

Referring now to the drawings:

FIG. 1 is a planar view of the distributing apparatus of the present invention having a discharge surface defined by an arc of 180°.

FIG. 2 is an end view of the distributing apparatus in FIG. 1.

FIG. 3 is a side view of the distributing apparatus in FIG. 1.

FIG. 4 is a perspective view of the distributing apparatus in FIG. 1.

FIG. 5 is a distributing apparatus of the present invention showing use of an embodiment having a chorded lip and discharge terminus having a beveled distributing surface defined by an arc of 180°.

FIG. 6 is an end view of the distributing apparatus in FIG. 5.

FIG. 7 is a side view of the distributing apparatus in FIG. 5.

FIGS. 1 through 4 illustrate one embodiment of the invented distributing apparatus for providing on a moving belt uniform distribution of salt briquettes, comprising a chute 2 having an upper vertical position 4, a central-curved portion 6, a lower horizontal portion 8 and an arcuate discharge lip 10. Said lip is positioned immediately above and adjacent to sloping flange discharge surface 12 which extends downwardly and outwardly from said lip. Arcuately shaped discharge terminus 14, the diameter of which is equal to the width of moving belt 16, defines the lower end of discharge surface 12. Upper edge 18, the diameter of which is equal to the width of discharge lip 10, defines the upper end of discharge surface 12. The angle of said sloping flange discharge surface is about 19° from the horizontal. Moving belt 16 travels through oven 20.

In operation salt briquettes fall from a die onto the vertical portion 4 of chute 2, slow in intermediate curved portion 6 and horizontal portion 8 until they reach minimum velocity at discharge lip 10. Upon passing discharge lip 10 said briquettes contact surface 12 causing their direction of movement to be changed to a direction radial and downward from discharge lip 10 so that an approximately equal number of briquettes reach each portion of belt 16. Upon reaching the terminus 14 of surface 12 the briquettes fall therefrom and are carried away by moving belt 16 onto oven 20.

FIGS. 5 through 7 illustrate another embodiment of the invented distributing apparatus. In this embodiment the distribution surface is comprised of a series of bevels rather than a smooth curve. Accordingly, each element in FIGS. 5 through 7 which varies from the equivalent element in FIGS. 1 through 4 is designated *a* after the number. These elements have been modified in accordance with the embodiment described on page 5 herein and include the discharge lip 10*a*, the discharge surface 12*a*, the discharge terminus 14*a* and the upper edge 18*a* of discharge surface 12*a*.

What is claimed is:

1. An apparatus for providing uniform distribution of particulate articles onto a moving belt which comprises an inclined discharge chute comprising a bottom and integral sidewalls, an arcuately shaped discharge lip extending outwardly from one end of said chute and coterminus with the bottom thereof, and a sloping discharge surface extending outwardly and downwardly from adjacent the edge of said discharge lip, said sloping discharge surface having an arcuately shaped discharge terminus adapted to receive articles discharged from the discharge lip and to distribute said articles to said sloping surface, the angle of incline of both the chute and the discharge surface varying from about 5° to about 40° from the horizontal.

2. An apparatus for providing uniform distribution of particulate units onto a moving belt which comprises an inclined discharge chute comprising a bottom and integral sidewalls, an arcuately shaped discharge lip extending outwardly from one end of said chute and coterminus with the bottom thereof, and a sloping discharge surface extending outwardly and downwardly from adjacent the edge of said discharge lip to an arcuately shaped discharge terminus adapted to receive units discharged from the discharge lip and to distribute said units to said sloping surface, said arcuate lip having a diameter approximately equal to the width of said inclined chute and said arcuate discharge terminus having a diameter approximately equal to the width of said moving belt, and the angle of incline of both the chute and the discharge surface varying from about 5° to about 40° from the horizontal.

3. A distributing apparatus as in claim 2 wherein the arcs of both the discharge lip and the discharge terminus are from about 145° to about 175°.

4. A distributing apparatus as in claim 2 wherein the arc of the discharge lip, and the arc of the discharge terminus are made up of chords connecting points on a curve, said points being defined by the intersection of said curve and lines perpendicular to the diameter or width of said curve and coequally spaced along said diameter, said sloping discharge surface thereby defining a series of generally pie-shaped bevels.

5. The distributing apparatus as in claim 2 wherein a vibrating, oscillating or sonic device is attached thereto.

6. The distribution apparatus as in claim 2 wherein means for restraining the flow of particulate units are positioned adjacent to the discharge lip of said inclined chute.

* * * * *